United States Patent
Hisamatsu et al.

(10) Patent No.: US 12,539,652 B2
(45) Date of Patent: Feb. 3, 2026

(54) METHOD FOR MANUFACTURING LAMINATE

(71) Applicant: JSP Corporation, Tokyo (JP)

(72) Inventors: Katsunori Hisamatsu, Wako (JP); Keiichi Hashimoto, Utsunomiya (JP)

(73) Assignee: JSP Corporation, Tokyo (JP)

( * ) Notice: Subject to any disclaimer, the term of this patent is extended or adjusted under 35 U.S.C. 154(b) by 118 days.

(21) Appl. No.: 18/033,741

(22) PCT Filed: Oct. 8, 2021

(86) PCT No.: PCT/JP2021/037346
§ 371 (c)(1),
(2) Date: Apr. 25, 2023

(87) PCT Pub. No.: WO2022/091750
PCT Pub. Date: May 5, 2022

(65) Prior Publication Data
US 2024/0017451 A1    Jan. 18, 2024

(30) Foreign Application Priority Data

Oct. 26, 2020  (JP) .................................. 2020-179052

(51) Int. Cl.
*B29C 44/20* (2006.01)
*B29K 23/00* (2006.01)
*B29K 105/04* (2006.01)

(52) U.S. Cl.
CPC ........ *B29C 44/206* (2013.01); *B29K 2023/00* (2013.01); *B29K 2105/048* (2013.01);
(Continued)

(58) Field of Classification Search
CPC ........... C08J 9/16; C08J 9/232; B29C 44/206; B29C 44/445; B29C 44/06; B29C 44/3426; B32B 1/08
See application file for complete search history.

(56) References Cited

U.S. PATENT DOCUMENTS 5,744,505 A * 4/1998 Fischer ................. C08J 9/16
521/146
2019/0276627 A1   9/2019 Takagi et al.

FOREIGN PATENT DOCUMENTS

EP    3835025 A1   6/2021
JP    7-138399 A   5/1995
(Continued)

OTHER PUBLICATIONS

Takayama, English Translation of JP2015155146A (Year: 2015).*
(Continued)

*Primary Examiner* — Michael A Tolin
*Assistant Examiner* — Hana C Page
(74) *Attorney, Agent, or Firm* — Fitch, Even, Tabin & Flannery LLP

(57) ABSTRACT

The present invention relates to a method for producing a laminate, wherein the laminate is obtained by integrally laminating an expanded beads molded article (a) composed of expanded beads A and having interconnected voids and an expanded beads molded article (b) composed of expanded particles B and having interconnected voids, the difference $[P_b-P_a]$ between the voidage $(P_a)$ of the expanded beads molded article (a) and the voidage $(P_b)$ of the expanded beads molded article (b) is 5% or more, and the expanded beads A and the expanded beads B satisfy the following (1) to (3): (1) a difference $[d_B-d_A]$ between an average hole diameter $(d_A)$ of the through-holes of the expanded beads (A) and an average hole diameter $(d_B)$ of the through-holes of the expanded beads (B) is 0.3 mm or more and 2 mm or less; (2) the expanded beads (B) have an average outer (Continued)

diameter $D_B$ of 3.5 mm or more and 5 mm or less; (3) a difference $[D_B-D_A]$ between an average outer diameter $D_A$ of the expanded beads (A) and an average outer diameter $D_B$ of the expanded beads (B) is −0.3 mm or more and 2 mm or less.

11 Claims, 1 Drawing Sheet

(52) U.S. Cl.
CPC ................ *B29K 2995/0082* (2013.01); *B29K 2995/0094* (2013.01)

(56) References Cited

FOREIGN PATENT DOCUMENTS

| JP | 2001-114552 A | 4/2001 |
|---|---|---|
| JP | 2005-208494 A | 8/2005 |
| JP | 2006-240286 A | 9/2006 |
| JP | 2015-143046 A | 8/2015 |
| JP | 2015-155146 A | 8/2015 |
| JP | 2018-80227 A | 5/2018 |
| JP | 2019-30597 A | 2/2019 |
| JP | 2019-193980 A | 11/2019 |
| JP | 2020-26082 A | 2/2020 |

OTHER PUBLICATIONS

Atsuo, English Translation of JP6899698B2 (Year: 2018).*
Tatzel (Machine Translation of EP0671250) (Year: 1995).*
International Search Report and Written Opinion for PCT/JP2021/037346, mailed Dec. 14, 2021, and English Translations submitted herewith (13 pages).
International Preliminary Report on Patentability for PCT/JP2021/037346, mailed May 2, 2023, and English Translation submitted herewith (4 pages).

* cited by examiner

[Fig. 1]
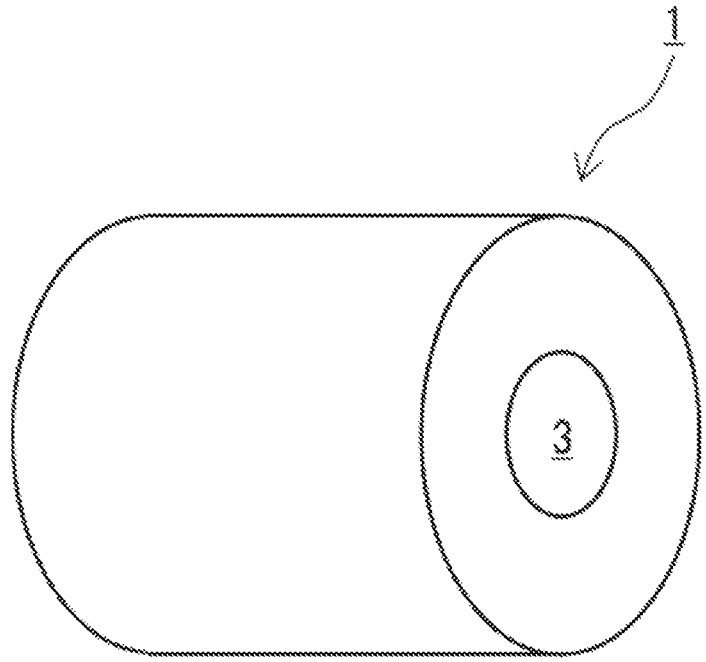
[Fig. 2]
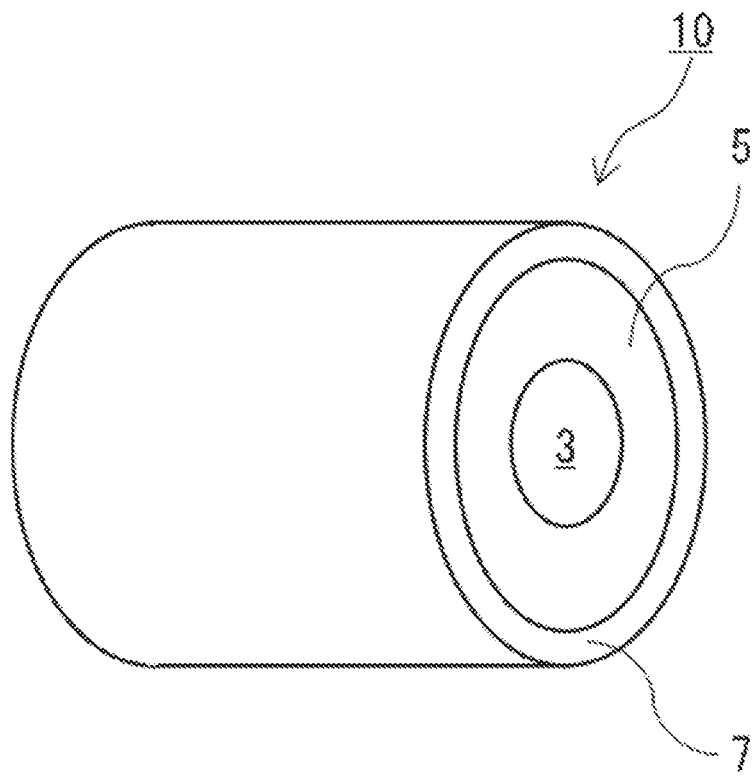

METHOD FOR MANUFACTURING LAMINATE

CROSS-REFERENCE TO RELATED APPLICATIONS

This application is a U.S. national phase application filed under 35 U.S.C. § 371 of International Application Number PCT/JP2021/037346 filed Oct. 8, 2021, designating the United States, which claims priority from Japanese Application Number 2020-179052, filed Oct. 26, 2020.

FIELD OF THE INVENTION

The present invention relates to a method for producing a laminate.

BACKGROUND OF THE INVENTION

Conventionally, in order to obtain desired characteristics, it is known that a laminate in which materials having different physical properties, etc. are laminated is produced by integral molding.

For example, PTL 1 discloses a thermoplastic resin in-mold molded article characterized in that the voidage of the molded article is non-uniform; and describes that it is possible to stably and economically obtain a molded article that is less likely to cause peeling and cracking, and maintains mechanical strength while having characteristics dependent on the voidage such as water permeability, air permeability, and sound absorbing property by making the voidage in one molded article non-uniform.

CITATION LIST

Patent Literature

PTL 1: JP 2006-240286 A

SUMMARY OF INVENTION

However, the thermoplastic resin in-mold molded article described in PTL 1 has a problem that the mechanical strength is insufficient because a high voidage is formed by using rod-shaped pre-expanded beads having a large aspect ratio L/D. In addition, for example, in a case where a laminate in which a plurality of layers having different voidages are laminated (hereinafter also referred to as a laminate having a difference in voidage) is produced by integral molding, there is a problem that it is difficult to control the voidage of each layer.

The present invention has been made in view of the above-described problems, and an object of the present invention is to provide a method for producing a laminate which is excellent in mechanical strength and can easily obtain a laminate having a desired difference in voidage under a wide range of molding conditions.

As a result of intensive research, the present inventors have found that the above-described problems can be solved by adopting a configuration shown below, and have completed the present invention.

That is, the present invention is as follows.

[1] A method for producing a laminate, including integrally molding cylindrical expanded thermoplastic resin beads A having a through-hole and an aspect ratio L/D of less than 2 and cylindrical expanded thermoplastic resin beads B having a through-hole and an aspect ratio L/D of less than 2, wherein the laminate is a laminate in which an expanded beads molded article (a) composed of the expanded beads A and having interconnected voids and an expanded beads molded article (b) composed of the expanded beads B and having interconnected voids are integrally laminated, a difference $[P_b-P_a]$ between a voidage $(P_a)$ of the expanded beads molded article (a) and a voidage $(P_b)$ of the expanded beads molded article (b) is 5% or more, and the expanded beads A and the expanded beads B satisfy the following requirements (1) to (3):
   (1) a difference $[d_B-d_A]$ between an average hole diameter $d_A$ of the through-holes of the expanded beads A and an average hole diameter $d_B$ of the through-holes of the expanded beads B is 0.3 mm or more and 2 mm or less;
   (2) the expanded beads B have an average outer diameter $D_B$ of 3.5 mm or more and 5 mm or less;
   (3) a difference $[D_B-D_A]$ between an average outer diameter $D_A$ of the expanded beads A and an average outer diameter $D_B$ of the expanded beads B is −0.3 mm or more and 2 mm or less.

[2] The method for producing a laminate as set forth in [1], wherein the average hole diameter $d_A$ of the through-holes of the expanded beads A is 0.5 mm or more and 2 mm or less.

[3] The method for producing a laminate as set forth in [1] or [2], wherein the average hole diameter $d_B$ of the through-holes of the expanded beads B is 2 mm or more and 3 mm or less.

[4] The method for producing a laminate as set forth in any one of [1] to [3], wherein the average outer diameter $D_A$ of the expanded beads A is 2 mm or more and 4.5 mm or less, and the difference $[D_B-D_A]$ between the average outer diameter $D_A$ of the expanded beads A and the average outer diameter $D_B$ of the expanded beads B is 0.1 mm or more and 2 mm or less.

[5] The method for producing a laminate as set forth in any one of [1] to [4], wherein a relationship between the difference $[d_B-d_A]$ (x) between the average hole diameter $d_A$ of the through-holes of the expanded beads A and the average hole diameter $d_B$ of the through-holes of the expanded beads B, and the difference $[D_B-D_A]$ (y) between the average outer diameter $D_A$ of the expanded beads A and the average outer diameter $D_B$ of the expanded beads B, satisfies the following formula (1):

$$0.6 \leq x+y \leq 2.2 \qquad (1).$$

[6] The method for producing a laminate as set forth in any one of [1] to [5], wherein a ratio $[d_A/D_A]$ of the average hole diameter $d_A$ to the average outer diameter $D_A$ of the expanded beads A is 0.3 or less.

[7] The method for producing a laminate as set forth in any one of [1] to [6], wherein a ratio of an apparent density of the expanded beads A to a bulk density of the expanded beads A is 1.7 or more and 2.3 or less, and a ratio of an apparent density of the expanded beads B to a bulk density of the expanded beads B is 2.3 or more and 3.0 or less.

[8] The method for producing a laminate as set forth in any one of [1] to [7], wherein the expanded beads A are expanded polyolefin resin beads, and the expanded beads B are expanded polyolefin resin beads.

[9] The method for producing a laminate as set forth in any one of [1] to [8], wherein the expanded beads A are composed of a polyolefin resin foamed core layer and a polyolefin resin cover layer covering the foamed core layer.

The method for producing a laminate as set forth in any one of [1] to [9], wherein the expanded beads B are composed of a polyolefin resin foamed core layer and a polyolefin resin cover layer covering the foamed core layer, and the polyolefin resin constituting the foamed core layer has a flexural modulus of 1000 MPa or more and 1500 MPa or less.

[11] The method for producing a laminate as set forth in any one of [1] to [10], wherein a ratio $[V_a:V_b]$ between a volume ($V_a$) of the expanded beads molded article (a) and a volume ($V_b$) of the expanded beads molded article (b) is 80:20 to 10:90.

According to the present invention, it is possible to provide a method for producing a laminate capable of easily obtaining a laminate having excellent mechanical strength and having a difference in voidage of, for example, 5% or more under a wide range of molding conditions.

BRIEF DESCRIPTION OF DRAWINGS

FIG. 1 is an appearance schematic diagram showing an example of cylindrical expanded beads having a through-hole according to the present invention.

FIG. 2 is an appearance schematic diagram showing an example of cylindrical expanded beads having a through-hole according to the present invention.

DESCRIPTION OF EMBODIMENTS

[Method for Producing Laminate]

The method for producing a laminate of the present invention (hereinafter, also simply referred to as "method for producing a laminate") is a method for producing a laminate, including integrally molding cylindrical expanded thermoplastic resin beads A having a through-hole and an aspect ratio L/D of less than 2 (hereinafter, also simply referred to as "expanded beads A") and cylindrical expanded thermoplastic resin beads B having a through-hole and an aspect ratio L/D of less than 2 (hereinafter, also simply referred to as "expanded beads B"), wherein the laminate is a laminate in which an expanded beads molded article (a) composed of the expanded beads A and having interconnected voids and an expanded beads molded article (b) composed of the expanded beads B and having interconnected voids are integrally laminated, a difference $[P_b-P_a]$ between a voidage ($P_a$) of the expanded beads molded article (a) and a voidage ($P_b$) of the expanded beads molded article (b) is 5% or more, and the expanded beads A and the expanded beads B satisfy the following requirements (1) to (3):

(1) a difference $[d_B-d_A]$ between an average hole diameter $d_A$ of the through-holes of the expanded beads A and an average hole diameter $d_B$ of the through-holes of the expanded beads B is 0.3 mm or more and 2 mm or less;
(2) the expanded beads B have an average outer diameter $D_B$ of 3.5 mm or more and 5 mm or less;
(3) a difference $[D_B-D_A]$ between an average outer diameter $D_A$ of the expanded beads A and an average outer diameter $D_B$ of the expanded beads B is −0.3 mm or more and 2 mm or less.

In the description herein, "X to Y" representing a numerical range has the same meaning as "X or more and Y or less", and represents a numerical range including X and Y which are end points of the numerical range.

In the method for producing a laminate of the present invention, by integrally molding the expanded beads A and the expanded beads B having a specific relationship, it is possible to easily produce a laminate in which the expanded beads molded article (a) and the expanded beads molded article (b) having a desired difference in voidage are integrated. In addition, in the method for producing a laminate of the present invention, by using the expanded beads having an aspect ratio L/D of less than 2, a laminate having excellent mechanical strength such as bending strength can be obtained.

Specifically, the method for producing a laminate of the present invention includes, for example, at least the following steps (1) to (3), and the laminate is produced by integrally laminating the expanded beads molded article (a) and the expanded beads molded article (b). In addition, the order of the step (1) and the step (2) is not particularly limited, and the step (2) may be performed after the step (1) is performed, or the step (1) may be performed after the step (2) is performed.

Step (1): an expanded beads A filling step of filling expanded beads A in a mold;
Step (2): an expanded beads B filling step of filling expanded beads B in a mold; and
Step (3): a main heating step of integrally heating expanded beads A and expanded beads B by supplying a heating medium.

<Steps (1) and (2)>

In the step (1), for example, the mold is opened, and the expanded beads A can be filled into the mold. Also in the step (2), the expanded beads B can be filled into the mold in the same manner as in the step (1).

<Step (3)>

In the step (3), for example, after closing the mold, a heating medium such as steam is supplied to the expanded beads A and the expanded beads B filled in a layer shape, the expanded beads A and the expanded beads B are integrally heated, then the expanded beads A and the expanded beads B are secondarily expanded, and the expanded beads A and the expanded beads B are fusion bonded to each other, whereby an expanded beads molded article (a) composed of the expanded beads A, in which the expanded beads A are fusion bonded to each other, and which has an interconnected void, and an expanded beads molded article (b) composed of the expanded beads B, in which the expanded beads B are fusion bonded to each other, and which has an interconnected void, can be integrally laminated. At this time, the expanded beads molded article (a) and the expanded beads molded article (b) are formed into the shapes of the respective molding spaces, and the expanded beads A and the expanded beads B are fusion bonded to each other at the interface between the expanded beads molded article (a) and the expanded beads molded article (b).

In the step (3), the pressure of the steam to be supplied (integral molding pressure) is appropriately changed depending on the base resins, etc. of the expanded beads A and the expanded beads B to be described later, and is preferably 0.12 MPa(G) or more, more preferably 0.16 MPa(G) or more, and is preferably 0.24 MPa(G) or less, more preferably 0.22 MPa(G) or less. In the description herein, the unit of [MPa(G)] means gauge pressure. The gauge pressure is a value obtained by subtracting atmospheric pressure from absolute pressure.

<Step (4)>

From the viewpoint of more easily producing a laminate, the method for producing a laminate of the present invention preferably further includes a temporary fusion bonding step (step (4)) of supplying a heating medium to temporarily fusion bond the previously filled expanded beads after performing any one of the step (1) and the step (2), that is, after filling any one of the expanded beads A and the expanded beads B into the mold. In the step (4), the pressure of the steam to be supplied (first layer molding pressure) is lower than the pressure of the steam in the step (3), and is preferably 0.08 MPa(G) or more, more preferably 0.10 MPa(G) or more, and is preferably 0.16 MPa(G) or less, more preferably 0.14 MPa(G) or less. It is to be noted that the temporary fusion bonding means fusion bonding the expanded beads to each other in a state where a void is left between the expanded beads in consideration of a passage of a heating medium to be supplied later, and the temporary fusion bonding is preferably make the expanded beads into the shake of an okoshi (millet or rice cake).

When the method for producing a laminate includes the step (4), any one of the step (1) and the step (2), and the step (4) are preferably performed continuously. The mold used at that time may be different from the mold used in the step (3). That is, the expanded beads A or B temporarily fusion bonded in the step (4) may be separately filled in a mold used in the step (3), and then the step (3) may be performed. However, from the viewpoint of excellent productivity, it is preferable that the method for producing a laminate of the present invention includes all of the steps (1) to (4) and all of the steps are continuously performed using one mold.

In the steps (1) and (2), a known method can be employed as a method for filling the expanded beads into the mold. For example, as long as the secondary expanding force of the expanded beads is not excessively improved, a method of pressurizing the expanded beads with a pressurized gas to give a predetermined internal pressure to the cells of the expanded beads and then filling the expanded beads into a mold (pressure filling method), a method of filling the expanded beads compressed with a pressurized gas into a pressurized mold and then releasing the pressure in the mold (compression filling method), and a method of mechanically compressing the expanded beads by previously opening the mold to expand the molding space before filling the expanded beads into the mold and closing the mold after filling (cracking filling method) can be employed.

In general, when a laminate in which different types of expanded beads molded articles being laminated is produced by integral molding, the voidage of the obtained expanded beads molded article tends to decrease as compared with the case of producing a single-layer expanded beads molded article composed of a single expanded bead. In addition, it is not easy to produce a laminate having a desired difference in voidage, and the difference in voidage tends to be small. This is because the total amount of heat of the heating medium supplied to the expanded beads tends to be large, and the molding pressure tends to fluctuate. According to the production method of the present invention, since the expanded beads A and the expanded beads B satisfy a specific relationship, a laminate having excellent mechanical strength and a desired difference in voidage can be easily obtained under a wide range of molding conditions. Specifically, in the production method of the present invention, the order of the steps (1) and (2) can be freely selected, and the range of the molding pressure at which a laminate having a desired difference in voidage being capable of producing is wide.

<Laminate>
(Total Thickness)

The total thickness of the laminate is appropriately changed depending on the use of the laminate, but is preferably 20 mm or more, more preferably 30 mm or more, and still more preferably 40 mm or more, and is preferably 500 mm or less, more preferably 450 mm or less, and still more preferably 400 mm or less.

(Density)

The density of the laminate is preferably 1.0 kg/m³ or more, more preferably 15 kg/m³ or more, and still more preferably 20 kg/m³ or more, and is preferably 150 kg/m³ or less, more preferably 100 kg/m³ or less, and still more preferably 50 kg/m³ or less, from the viewpoint of excellent balance between lightweight properties, and mechanical strength. The density of the laminate can be obtained by dividing the mass of the laminate by the volume of the laminate and converting the unit to [kg/m³]. In addition, the volume of the laminate can be obtained by a method for obtaining by calculation from the external dimensions thereof, a method for obtaining by 3D scanning, or the like.

<Expanded Beads Molded Article (a)>

The expanded beads molded article (a) is composed of expanded thermoplastic resin beads A and has interconnected voids.

The voidage ($P_a$) of the expanded beads molded article (a) is not particularly limited as long as it is lower than the voidage ($P_b$) of the expanded beads molded article (b) by 5% or more, but is preferably 5% or more, more preferably 7% or more, still more preferably 10% or more, and particularly preferably 12% or more, and is preferably 20% or less, and more preferably 17% or less. When the voidage of the expanded beads molded article (a) is within the above range, a laminate having excellent appearance can be obtained while exhibiting the characteristics of a molded article having voids.

The continuous voids of the expanded beads molded article (a) are composed of voids present between the expanded beads constituting the expanded beads molded article (a) and voids formed by the through-holes of the expanded beads constituting the expanded beads molded article (a).

The voidage of the expanded beads molded article (a) can be measured, for example, by the following method. First, a rectangular parallelepiped test piece is cut out from the central portion of the expanded beads molded article (a). The test piece is immersed in a measuring cylinder containing ethanol, and the true volume Vc [L] of the test piece is obtained from the rise in the liquid level of the ethanol. Further, the apparent volume Vd [L] is obtained from the external dimensions of the test piece. From the obtained true volume Vc and apparent volume Vd, the voidage of the expanded beads molded article (a) can be obtained by the following formula (2).

$$\text{Voidage}(\%) = [(Vd - Vc)/Vd] \times 100 \quad (2)$$

The thickness ($H_a$) of the expanded beads molded article (a) is appropriately changed depending on the use of the laminate, but is preferably 10 mm or more, more preferably 15 mm or more, still more preferably 20 mm or more, and even more preferably 25 mm or more, and is preferably 100 mm or less, more preferably 80 mm or less, still more preferably 60 mm or less, and even more preferably 40 mm or less, from the viewpoint of increasing the mechanical strength while maintaining the characteristics such as sound absorbing property of the laminate.

The thickness of the expanded beads molded article (a) can be obtained by cutting out the expanded beads molded article (a) from the laminate, obtaining the volume of the expanded beads molded article (a), dividing the volume of the expanded beads molded article (a) by the projected area of the expanded beads molded article (a) as viewed from the top, and converting the obtained value into the unit [mm].

(Expanded Thermoplastic Resin Beads A)

The expanded thermoplastic resin beads A have a through-hole, an aspect ratio L/D of less than 2, and a cylindrical shape. When the expanded beads A do not have through-holes and/or have an aspect ratio of 2 or more, it is difficult to obtain a laminate having both desired voidage and mechanical strength.

<<Aspect Ratio L/D>>

From the viewpoint of enhancing the mechanical strength, the aspect ratio L/D of the expanded beads A is preferably 1.7 or less, more preferably 1.5 or less, and still more preferably 1.3 or less, and the lower limit thereof is not particularly limited, but is generally 0.8.

The aspect ratio L/D of the expanded beads A is a value obtained by measuring the maximum length (L) of 100 expanded beads A selected at random and the maximum cross-sectional diameter (D) of the cross section of the beads in a direction orthogonal to the length direction of the maximum length with a caliper or the like, calculating the ratio (L/D), and arithmetically averaging the values.

<<Average Hole Diameter $d_A$ of Through-Holes>>

The average hole diameter $d_A$ of the through-holes of the expanded beads A is not particularly limited as long as the above requirement (1) is satisfied, but is preferably 0.5 mm or more, more preferably 0.6 mm or more, and is preferably 2 mm or less, more preferably less than 1.5 mm, still more preferably less than 1 mm, and even more preferably 0.8 mm or less, from the viewpoint of more easily producing a laminate having a desired difference in voidage and from the viewpoint of obtaining a laminate having more excellent surface appearance.

The average hole diameter $d_A$ of the through-holes of the expanded beads A is obtained as follows. Fifty or more expanded beads A randomly selected from the group of expanded beads A are cut perpendicularly to the through-holes at a position where the area of the cut surface was maximum. A photograph of the cut surface is taken, and the cross-sectional area (opening area) of the portion of the through-hole is obtained, the diameter of a virtual perfect circle having the same area as the area is calculated, and the value obtained by arithmetically averaging these values is taken as an average hole diameter $d_A$ of the through-holes of the expanded beads A.

<<Average Outer Diameter $D_A$>>

The average outer diameter $D_A$ of the expanded beads A is not particularly limited as long as the above requirement (3) is satisfied, but is preferably 2 mm or more, more preferably 2.5 mm or more, and still more preferably 3 mm or more, and is preferably 4.5 mm or less, more preferably 4.3 mm or less, and still more preferably 4 mm or less, from the viewpoint of more easily producing a laminate having excellent mechanical strength and a desired difference in voidage.

The average outer diameter $D_A$ of the expanded beads A is obtained as follows. Fifty or more expanded beads A randomly selected from the group of expanded beads A are cut perpendicularly to the through-holes at a position where the area of the cut surface was maximum. A photograph of the cut surface is taken, the cross-sectional area (the cross-sectional area including the opening portion of the through-hole) of the expanded bead A is obtained, the diameter of a virtual perfect circle having the same area as the area is calculated, and the value obtained by arithmetically averaging these values is taken as an average outer diameter $D_A$ of the expanded beads A.

<<Ratio $[d_A/D_A]$>>

The ratio $[d_A/D_A]$ of the average hole diameter $d_A$ to the average outer diameter $D_A$ of the expanded beads A is preferably 0.7 or less, more preferably 0.5 or less, still more preferably 0.4 or less, even more preferably 0.3 or less, and particularly preferably less than 0.25, and the lower limit thereof is not particularly limited but is 0.1, from the viewpoint of more easily producing a laminate having a desired difference in voidage and from the viewpoint of obtaining a laminate having a more excellent surface appearance.

<<Apparent Density>>

The apparent density of the expanded beads A is preferably 30 kg/m$^3$ or more, more preferably 35 kg/m$^3$ or more, and still more preferably 40 kg/m$^3$ or more, and is preferably 200 kg/m$^3$ or less, more preferably 150 kg/m$^3$ or less, still more preferably 100 kg/m$^3$ or less, and even more preferably 80 kg/m$^3$ or less, from the viewpoint of more easily producing a laminate having excellent mechanical strength and lightweight properties.

The apparent density of the expanded beads A is obtained as follows. First, the group of expanded beads A is allowed to stand for 2 days under conditions of a relative humidity of 50%, a temperature of 23° C., and 1 atm. Next, a measuring cylinder containing ethanol at 23° C. was prepared, and an arbitrary amount of the group of expanded beads A (mass W1 of the group of expanded beads A) is immersed in ethanol in the measuring cylinder using a tool such as a wire gauze. Then, in consideration of the volume of a tool such as a wire gauze, the volume V1 [L] of the group of expanded beads A read from the water level rise is measured. The apparent density of the expanded beads A is obtained by dividing the mass W1 [g] of the group of expanded beads A put in the measuring cylinder by the volume V1 [L] (W1/V1) and converting the unit to [kg/m$^3$].

<<Bulk Density>>

The bulk density of the expanded beads A is preferably 1.0 kg/m$^3$ or more, more preferably 15 kg/m$^3$ or more, and still more preferably 20 kg/m$^3$ or more, and is preferably 150 kg/m$^3$ or less, more preferably 100 kg/m$^3$ or less, still more preferably 80 kg/m$^3$ or less, even more preferably 50 kg/m$^3$ or less, and particularly preferably 30 kg/m$^3$ or less, from the viewpoint of achieving both mechanical strength and lightweight properties of the obtained laminate in a balanced manner.

The bulk density of the expanded beads A is obtained as follows. The expanded beads A are randomly taken out from the group of expanded beads A and put into a measuring cylinder having a volume of 1 L, a large number of expanded beads are accommodated up to a scale of 1 L so as to be in a naturally deposited state, and the mass W2 [g] of the accommodated expanded beads is divided by the accommodating volume V2 (1 [L]) (W2/V2), and the unit is converted into [kg/m$^3$], thereby Obtaining the bulk density of the expanded beads A.

<<Ratio of Apparent Density/Bulk Density>>

The ratio (apparent density/bulk density) of the apparent density of the expanded beads A to the bulk density of the expanded beads A is preferably 1.7 or more, and is preferably 2.5 or less, and more preferably 2.3 or less, from the viewpoint of more easily producing a laminate having a desired difference in voidage.

<<Base Resin>>

Examples of the thermoplastic resin as the base resin of the expanded beads A include a polystyrene resin; polyolefin resins such as a polyethylene resin, and a polypropylene resin; polyester resins such as polyethylene terephthalate and polylactic acid; and polycarbonate resins. Among these, a polyolefin resin is preferred, and a polypropylene resin is more preferred from the viewpoint of mechanical strength and the like. That is, the expanded beads A are preferably expanded polyolefin resin beads, and more preferably expanded polypropylene resin beads.

When the expanded beads A have a multilayer structure as described later, the base resin of the expanded beads A means a resin constituting a foamed core layer.

When the base resin of the expanded beads A is a polypropylene resin, the flexural modulus thereof is preferably 600 MPa or more, and more preferably 800 MPa or more, from the viewpoint of mechanical strength and the like, and is preferably 1000 MPa or less, from the viewpoint of producing a good molded article even at a low molding pressure. When the expanded beads A are expanded beads having a multilayer structure as described later, it is preferred that the polypropylene resin constituting the foamed core layer satisfies the above flexural modulus.

The flexural modulus of the polypropylene resin can be obtained by preparing a test piece (test piece dimensions: length 80 mm, width 10 mm, and thickness 4 mm) in accordance with JIS K 7171:2016. When the expanded beads A are expanded beads having a multilayer structure as described later, it is preferred that the polypropylene resin constituting the core layer satisfies the above flexural modulus.

<<Configuration>>

Here, FIG. 1 and FIG. 2 are appearance schematic diagrams showing an example of cylindrical expanded beads having a through-hole according to the present invention. As shown in FIG. 1, the expanded beads A may be an expanded bead 1 having a through-hole 3 penetrating the expanded bead 1 and having a cylindrical shape. In addition, as shown in FIG. 2, the expanded beads A may be an expanded bead 10 having a multilayer structure including a foamed core layer 5 having a through-hole 3 and a cylindrical shape, and a cover layer 7 that covers the foamed core layer 5.

As shown in FIG. 2, the expanded beads A are preferably expanded beads 10 having a multilayer structure including an expanded polyolefin resin core layer 5 (hereinafter, also simply referred to as "foamed core layer") and a polyolefin resin cover layer 7 (hereinafter, also simply referred to as "cover layer") that covers the foamed core layer 5.

From the viewpoint of improving the fusion bonding properties of the expanded beads during the in-mold molding and from the viewpoint of ensuring the voidage of the laminate by suppressing excessive secondary expanding, it is preferable that the cover layer covers substantially the entire outer surface of the foamed core layer, and it is more preferable that the cover layer completely covers the entire outer surface of the foamed core layer. In addition, there may be a foamed core layer portion which is not covered with the cover layer as long as the object and effects of the present invention are not impaired. From the same viewpoint, the cover layer is preferably in a non-foamed state or a substantially non-foamed state, and more preferably in a non-foamed state. The cover layer may contain a small amount of cells as long as the object and effects of the present invention are not impaired.

The difference [Tmc−Tms] between the melting point (Tmc) of the foamed core layer and the melting point (Tms) of the cover layer is preferably higher than 0° C., more preferably 5° C. or higher, and still more preferably 7° C. or higher, from the viewpoint of improving the fusion bonding properties of the expanded beads to more easily produce a laminate having excellent mechanical strength. The upper limit thereof is preferably 20° C. from the viewpoint of suppressing peeling between the foamed core layer and the cover layer. The resin constituting the cover layer is preferably a polyolefin resin, and more preferably a polypropylene resin.

The mass ratio of the cover layer to the foamed core layer (cover layer/foamed core layer) is preferably 0.5/99.5 to 20/80, more preferably 1/99 to 15/85, and still more preferably 3/97 to 10/90, from the viewpoint of improving the fusion bonding properties of the expanded beads.

(Method for Producing Expanded Beads A)

The expanded beads A can be produced, for example, by a method including the following steps (A) to (D). Here, expanded beads having a multilayer structure including a foamed core layer and a cover layer covering the foamed core layer will be described as an example.

Step (A): a granulation step of separately melt-kneading a base resin for constituting a foamed core layer and a resin for constituting a cover layer, and co-extruding the base resin and the resin to obtain multilayer resin particles having a through-hole and including a core layer in a non-foamed state and a cover layer covering the core layer;

Step (B): a dispersion step of dispersing the multilayer resin particles in a dispersing medium in a sealed container;

Step (C): an impregnation step of heating the dispersion to a temperature at which the base resin for constituting the foamed core layer is softened or higher to impregnate the multilayer resin particles with a blowing agent; and Step (D): an expanding step of releasing the foamable multilayer resin particles impregnated with the blowing agent together with the dispersing medium from the sealed container into a lower-pressure atmosphere than that in the sealed container to expand at least the core layer to form a foamed core layer, thereby producing expanded beads.

<<Step (A)>>

In the step (A), for example, an extruder having a core layer-forming extruder, a cover layer-forming extruder, and a multilayer strand-forming die disposed on the outlet side of these extruders can be used. A base resin for constituting a foamed core layer and an additive to be added as necessary are supplied to an extruder for forming a core layer and melt-kneaded to obtain a core layer-forming melt-kneaded material. A resin for constituting a cover layer and an additive to be added as necessary are supplied to an extruder for forming a cover layer and melt-kneaded to obtain a cover layer-forming melt-kneaded material. The core layer-forming melt-kneaded material and the cover layer-forming melt-kneaded material are introduced into a multilayer strand-forming die and merged to form a composite of a sheath-core structure having a core layer in a non-foamed state and a cover layer in a non-foamed state for covering the core layer. Then, the composite is extruded from a small hole of a die attached to the tip of an extruder in the form of a strand having a through-hole and a cylindrical shape, cooled in water, and cut by a pelletizer to a predetermined mass (strand cutting method), whereby multilayer resin particles having a through-hole and composed of a cylindrical core layer in a non-foamed state and a cover layer covering the core layer can be obtained. As a method of cutting the extruded composite, in addition to the above-described method, an underwater cutting method in which the composite is extruded in water and cut, a hot cutting method in which the composite is cut immediately after being extruded in air, or the like can be employed.

If necessary, additives such as a cell controlling agent, a flame retardant, a flame retardant aid, a cell nucleating agent, a plasticizer, an antistatic agent, an antioxidant, an ultraviolet inhibitor, a light stabilizer, a conductive filler, and an antimicrobial agent can be added to the multilayer resin particles composed of the core layer in a non-foamed state and the cover layer. When an additive is added, it can be added in the step (A). Examples of the cell controlling agent include inorganic powders such as talc, mica, zinc borate, calcium carbonate, silica, titanium oxide, gypsum, zeolite, borax, aluminum hydroxide, and carbon; and organic powders such as a phosphoric acid-based nucleating agent, a phenol-based nucleating agent, an amine-based nucleating agent, and a polyethylene fluoride-based resin powder. In the case of adding a cell controlling agent, the content of the cell controlling agent in the multilayer resin particles is preferably 0.01 to 1 part by mass with respect to 100 parts by mass of the multilayer resin particles.

<<Step (B)>>

In the step (B), the multilayer resin particles can be dispersed in a dispersing medium in a container that can be sealed and can withstand heating and pressurization, such as an autoclave, by using, for example, a stirrer.

The dispersing medium is not particularly limited as long as it does not dissolve the multilayer resin particles, and examples thereof include water and alcohols such as ethylene glycol, glycerin, methanol, and ethanol. Among these, water is preferable.

In the step (B), it is preferable to further add a dispersing agent to the dispersing medium in order to prevent fusion bond between the multilayer resin particles. Examples of the dispersing agent include organic dispersing agents such as polyvinyl alcohol, polyvinyl pyrrolidone, and methyl cellulose; and sparingly soluble inorganic salts such as aluminum oxide, zinc oxide, kaolin, mica, magnesium phosphate, and tricalcium phosphate. These can be used alone or in combination of two or more thereof. Among these, from the viewpoint of ease of handling, sparingly soluble inorganic salts are preferable, and kaolin is more preferable.

A surfactant may be further added to the dispersing medium. Examples of the surfactant include sodium alkylbenzenesulfonate, sodium lauryl sulfate, sodium polyoxyethylene alkyl ether phosphate, sodium polyoxyethylene alkyl ether sulfate, and other anionic surfactants and nonionic surfactants which are generally used in suspension polymerization.

<<Step (C)>>

In the step (C), for example, the foamable multilayer resin particles can be obtained by heating the dispersion to a temperature at which the base resin constituting the foamed core layer is softened or higher, and impregnating with a blowing agent.

The blowing agent is not particularly limited as long as it can expand the multilayer resin particles. Examples of the blowing agent include inorganic physical blowing agents such as air, nitrogen, carbon dioxide, argon, helium, oxygen, and neon; aliphatic hydrocarbons such as propane, normal butane, isobutane, normal pentane, isopentane, and normal hexane; and organic physical blowing agents such as alicyclic hydrocarbons such as cyclohexane and cyclopentane; halogenated hydrocarbons such as chlorofluoromethane, trifluoromethane, 1,1-difluoroethane, 1,1,1,2-tetrafluoroethane, methyl chloride, ethyl chloride, and methylene chloride; dialkyl ethers such as dimethyl ether, diethyl ether, and methyl ethyl ether. Among these, an inorganic physical blowing agent which does not destroy the ozone layer and is inexpensive is preferable, nitrogen, air, and carbon dioxide are more preferable, and carbon dioxide is particularly preferable. These are used alone or in combination of two or more thereof.

The blending amount of the blowing agent is determined in consideration of the desired apparent density of the expanded beads, the type of the base resin, the type of the blowing agent, and the like. In general, the organic physical blowing agent is preferably used in an amount of 5 to 50 parts by mass, and the inorganic physical blowing agent is preferably used in an amount of 0.5 to 30 parts by mass, with respect to 100 parts by mass of the multilayer resin particles.

The heating temperature in the step (C) is preferably equal to or higher than the melting point of the base resin and equal to or lower than the melting point +80° C., and to be specific, it is preferably 100° C. to 230° C. The holding time at the heating temperature is preferably 1 minute or more, more preferably 20 minutes or more, and is preferably 100 minutes or less, more preferably 60 minutes or less.

In addition, by adjusting the heating temperature and the holding time, it is possible to produce expanded beads having a crystal structure in which a melting peak specific to the resin and one or more melting peaks (high temperature peaks) on the high temperature side thereof appear in a DSC curve obtained by differential scanning calorimetry (DSC).

<<Step (D)>>

In the step (D), for example, the foamable multilayer resin particles impregnated with the blowing agent and heated in the step (C) are released from the sealed container into a lower-pressure atmosphere than that in the sealed container, and at least the core layer is expanded to form a foamed core layer; thereby producing the expanded beads.

To be more specific, the expanded beads can be produced by opening one end of the sealed container below the surface of the water, releasing the foamable multilayer resin particles impregnated with the blowing agent together with the dispersing medium from the sealed container into a lower-pressure atmosphere than that in the sealed container, usually under atmospheric pressure, and expanding at least the core layer of the foamable multilayer resin particles to form a foamed core layer, while maintaining the inside of the sealed container at a pressure equal to or higher than the vapor pressure of the blowing agent. Alternatively, expanded beads can also be produced by cooling and taking out the foamable multilayer resin particles having passed through the step (C), and then expanding the foamable multilayer resin particles by heating with a heating medium such as hot air or steam.

In the step (D), the temperature during expanding is usually preferably 110° C. to 170° C. Further, the pressure inside the sealed container is preferably equal to or higher than the vapor pressure, and 5 MPa(G) or lower.

The above steps (B) to (D) are preferably carried out as a series of steps in a single sealed container. However, the steps (B) to (D) may be carried out as separate steps, for example, by taking out the multilayer resin particles or the like in each step, putting the particles into the sealed container again, and carrying out the next step.

In order to obtain expanded beads having a particularly low apparent density, the expanded beads are usually aged under atmospheric pressure, then put into a pressurizable sealed container, pressurized by introducing a pressurized gas such as air into the container to increase the internal pressure of the expanded beads, and heated in the container far a predetermined time using a heating medium such as steam to obtain expanded beads having an even lower apparent density (second stage expanded beads).

<Expanded Beads Molded Article (b)>

The expanded beads molded article (D) is composed of expanded beads B and has interconnected voids.

The voidage ($P_b$) of the expanded beads molded article (b) is not particularly limited as long as it is higher than the voidage ($P_a$) of the expanded beads molded article (a) by 5% or more, but is preferably 10% or more, more preferably 15% or more, and still more preferably 20% or more, and is preferably 50% or less, more preferably 45% or less, still more preferably 40% or less, and even more preferably 35% or less. When the voidage of the expanded beads molded article (b) is within the above range, a laminate capable of sufficiently exhibiting the characteristics of a molded article having voids while maintaining the mechanical strength of the laminate is obtained.

The voidage of the expanded beads molded article (b) can be measured by the same method as the measurement of the voidage of the expanded beads molded article (a) described above.

The continuous voids of the expanded beads molded article (b) are composed of voids present between the expanded beads constituting the expanded beads molded article (b) and voids formed by the through-holes of the expanded beads constituting the expanded beads molded article (b).

(Difference between Voidage ($P_a$) of Expanded Beads Molded Article (a) and Voidage ($P_b$) of Expanded Beads Molded Article (b))

The present invention relates to a method for producing a laminate in which an expanded beads molded article (a) and an expanded beads molded article (b) having interconnected voids are integrally laminated by integral molding, and in particular, it is possible to easily produce a laminate having a difference of a specific value or more between the voidage of the expanded beads molded article (a) and the voidage of the expanded beads molded article (b). Since there is a sufficient difference between the voidage of the expanded beads molded article (a) and the voidage of the expanded beads molded article (b) constituting the laminate, the laminate can be expected to be used in various applications, for example, because the laminate exhibits sound absorbing properties in a wide frequency range and the balance between properties such as air permeability and water permeability and mechanical strength can be easily controlled.

From the above viewpoint, the difference between the voidage of the expanded beads molded article (a) and the voidage of the expanded beads molded article (b) [voidage ($P_b$)–voidage ($P_a$)] is 5% or more, preferably 6% or more, and more preferably 7% or more. From the same viewpoint, the upper limit of the difference [voidage ($P_b$)–voidage ($P_a$)] is preferably 30% or less, more preferably 25% or less, and still more preferably 18% or less.

The thickness ($H_b$) of the expanded beads molded article (b) is appropriately changed depending on the use of the laminate, but is preferably 10 mm or more, more preferably 15 mm or more, still more preferably 20 mm or more, and even more preferably 25 mm or more, and is preferably 400 mm or less, more preferably 350 mm or less, still more preferably 300 mm or less, and even more preferably 250 mm or less, from the viewpoint of sufficiently exhibiting the characteristics unique to the molded article having voids such as sound absorbing property.

The thickness of the expanded beads molded article (b) can be measured by the same method as the measurement of the thickness of the expanded beads molded article (a).

From the viewpoint of the balance between the characteristics unique to the molded article having voids such as sound absorbing property and the mechanical strength, the ratio of the thickness ($H_a$) of the expanded beads molded article (a) to the thickness ($H_b$) of the expanded beads molded article (b) [thickness ($H_a$):thickness ($H_b$b)] is preferably 80:20 to 10:90, more preferably 70:30 to 20:80, and still more preferably 60:40 to 30:70.

Similarly, from the viewpoint of the balance between the characteristics unique to the molded article having voids such as sound absorbing property and the mechanical strength, the ratio of the volume ($V_a$) of the expanded beads molded article (a) to the volume ($V_b$) of the expanded beads molded article (b) [volume ($V_a$):volume ($V_b$)] is preferably 80:20 to 10:90, more preferably 70:30 to 20:80, and still more preferably 60:40 to 30:70.

The volumes of the expanded beads molded article (a) and the expanded beads molded article (b) can be obtained by a method in which each of the expanded beads molded articles is cut out from the laminate, and the volumes are obtained by calculation from the external dimensions thereof, a method in which the volumes are obtained by 3D scanning, or the like.

(Expanded Thermoplastic Resin Beads B)

The expanded thermoplastic resin beads B have a through-hole, an aspect ratio L/D of less than 2, and a cylindrical shape. When the expanded beads B do not have through-holes and/or have an aspect ratio of 2 or more, it is difficult to obtain a laminate having both desired voidage and mechanical strength.

<<Aspect Ratio L/D>>

From the viewpoint of mechanical strength, the aspect ratio L/D of the expanded beads B is preferably 1.7 or less, more preferably 1.5 or less, and still more preferably 1.3 or less, and the lower limit thereof is not particularly limited, but is 0.8.

The aspect ratio L/D of the expanded beads B is obtained by the same method as that for the aspect ratio L/D of the expanded beads A.

<<Average Hole Diameter $d_B$ of Through-Holes>>

The average hole diameter $d_B$ of the through-holes of the expanded beads B is not particularly limited as long as the above requirement (1) is satisfied, but is preferably 2 mm or more, and more preferably 2.2 mm or more, and is preferably 3 mm or less, more preferably 2.8 mm or less, still more preferably 2.6 mm or less, and even more preferably 2.5 mm or less, from the viewpoint of increasing the voidage of the expanded beads molded article (b) and from the viewpoint of more easily producing a laminate having a desired difference in voidage.

The average hole diameter $d_B$ of the through-holes of the expanded beads B is obtained by the same method as that for the average hole diameter $d_A$ of the through-holes of the expanded beads A.

Hereinafter, specific requirements (1) to (3) satisfied by the expanded beads A and the expanded beads B of the present invention will be described in detail. The present invention is a method for producing a laminate in which an expanded beads molded article (a) and an expanded beads molded article (b) having interconnected voids are integrally laminated, by integrally molding, wherein by integrally molding two types of expanded beads satisfying specific requirements (1) to (3), a laminate having excellent mechanical strength and a desired difference in voidage can be easily obtained under a wide range of molding conditions.

<<(1) Difference between Average Hole Diameter $d_A$ of Through-Holes of Expanded Beads A and Average Hole Diameter $d_B$ of Through-Holes of Expanded Beads B [$d_B$–$d_A$]>>

A difference [$d_B$–$d_A$] between an average hole diameter $d_A$ of the through-holes of the expanded beads A and an average hole diameter $d_B$ of the through-holes of the expanded beads B is 0.3 mm or more and 2 mm or less. When the average hole diameter $d_A$ and the average hole diameter $d_B$ have the above specific difference, a laminate having a difference in voidage can be easily produced. In particular, since the average hole diameter $d_A$ of the expanded beads A is smaller than the average hole diameter $d_B$ of the expanded beads B, the expanded beads molded article (a) having a low voidage can be formed even at a low molding pressure. On the other hand, when a laminate is produced by using a combination of expanded beads having the difference [$d_B-d_A$] of less than 0.3 mm, the laminate may have a small difference in voidage or may have a low mechanical strength.

From the viewpoint of more easily producing a laminate having excellent mechanical strength and a desired difference in voidage, the difference [$d_B-d_A$] is preferably 0.5 mm or more, more preferably 0.7 mm or more, still more preferably 1 mm or more, and particularly preferably 1.2 mm or more. On the other hand, from the viewpoint of maintaining the mechanical strength of the laminate, the difference [$d_B-d_A$] is preferably 1.8 mm or less.

<<(2) Average Outer Diameter $D_B$>>

The average outer diameter $D_B$ of the expanded beads B is 3.5 mm or more and 5 mm or less. When the average outer diameter $D_B$ of the expanded beads B is within the above range, a decrease in the voidage of the expanded bead molded article (b) can be suppressed while maintaining the mechanical strength of the laminate, and a laminate having a desired difference in the voidage can be easily produced. From such a viewpoint, the average outer diameter $D_B$ is preferably 3.7 mm or more, and is preferably 5 mm or less, more preferably 4.8 mm or less, still more preferably 4.5 mm or less, and even more preferably 4.3 mm or less.

The average outer diameter $D_B$ of the expanded beads B is obtained in the same manner as the average outer diameter $D_A$ of the expanded beads A.

<<(3) Difference between Average Outer Diameter $D_A$ of Expanded Beads A and Average Outer Diameter $D_B$ of Expanded Beads B [$D_B-D_A$]>>

The difference [$D_B-D_A$] between the average outer diameter $D_A$ of the expanded beads A and the average outer diameter $D_B$ of the expanded beads B is −0.3 mm or more and 2 mm or less, preferably 0.1 mm or more, and more preferably 0.3 mm or more, and is preferably 1.5 mm or less, more preferably 1.3 mm or less, and still more preferably 1.0 mm or less. When the difference [$D_B-D_A$] is within the above range, the fining properties of the expanded beads A and the expanded beads B into the mold can be controlled, and a laminate having a desired difference in voidage can be easily produced.

From the viewpoint of controlling the difference in the voidage of the laminate, it is preferable to preferably control both the voids present between the expanded beads constituting each expanded beads molded article and the voids formed by the through-holes of the expanded beads constituting each expanded beads molded article. Specifically, the voids present between the expanded beads constituting each expanded beads molded article can be adjusted mainly by the degree of the filling properties of the expanded beads. Further, the voids formed by the through-holes of the expanded beads constituting each expanded beads molded article can be adjusted mainly by the size of the hole diameter of the expanded beads. From such a viewpoint, from the viewpoint of more easily producing a laminate having a desired difference in voidage while maintaining the mechanical strength of the laminate, it is preferable that the expanded beads A and the expanded beads B satisfy the following formula (1).

$$0.6 \leq x+y \leq 2.2 \tag{1}$$

Here, x is the difference [$D_B-D_A$] (mm), and y is the difference [$d_B-d_A$] (mm).

From the viewpoint of more easily producing a laminate having a desired difference in voidage, it is preferable that the average outer diameter $D_A$ of the expanded beads A is 2 mm or more and 4.5 mm or less, and the difference [$D_B-D_A$] between the average outer diameter $D_A$ of the expanded beads A and the average outer diameter $D_B$ of the expanded beads B is 0.1 mm or more and 2 mm or less.

<<Ratio [$d_B/D_B$]>>

The ratio [$d_B/D_B$] of the average hole diameter $d_B$ to the average outer diameter $D_B$ of the expanded beads B is preferably 0.3 or more, more preferably 0.5 or more, and is preferably 1.5 or less, more preferably 1.0 or less, from the viewpoint of more easily producing a laminate having a desired difference in voidage.

<<Apparent Density>>

The apparent density of the expanded beads B is preferably 40 kg/m$^3$ or more, more preferably 45 kg/m$^3$ or more, and still more preferably 50 kg/m$^3$ or more, and is preferably 250 kg/m$^3$ or less, more preferably 200 kg/m$^3$ or less, still more preferably 150 kg/m$^3$ or less, even more preferably 100 kg/m$^3$ or less, and yet still more preferably 80 kg/m$^3$ or less, from the viewpoint of more easily producing a laminate having a desired difference in voidage.

The apparent density of the expanded beads B is obtained by the same method as that for the apparent density of the expanded beads A.

<<Bulk Density>>

The bulk density of the expanded beads A is preferably 10 kg/m$^3$ or more, more preferably 15 kg/m$^3$ or more, and still more preferably 20 kg/m$^3$ or more, and is preferably 200 kg/m$^3$ or less, more preferably 150 kg/m$^3$ or less, still more preferably 100 kg/m$^3$ or less, even more preferably 50 kg/m$^3$ or less, and yet still more preferably 30 kg/m$^3$ or less, from the viewpoint of achieving both mechanical strength and lightweight properties of the obtained laminate in a balanced manner.

The bulk density of the expanded beads B is obtained by the same method as that for the bulk density of the expanded beads A.

<<Ratio of Apparent Density/Bulk Density>>

The ratio (apparent density/bulk density) of the apparent density of the expanded beads B to the bulk density of the expanded beads B is preferably 2.3 or more, and is preferably 3.0 or less, more preferably 2.8 or less, and still more preferably 2.6 or less, from the viewpoint of more easily producing a laminate having a desired difference in voidage.

<<Base Resin>>

Examples of the base resin for the expanded beads B include the same resins as those for the expanded beads A. Among them, the base resin of the expanded beads B is preferably a polyolefin resin, and more preferably a polypropylene resin. That is, the expanded beads B are preferably expanded polyolefin resin beads, and more preferably expanded polypropylene resin beads.

When the expanded beads B have a multilayer structure as described later, the base resin of the expanded beads B means a resin constituting a core layer.

When the base resin of the expanded beads B is a polypropylene resin, the flexural modulus thereof is preferably 600 MPa or more, more preferably 800 MPa or more, stiff more preferably 1000 MPa or more, and particularly preferably 1200 MPa or more, and is preferably 1500 MPa or less, from the viewpoint of improving the mechanical strength of the laminate and from the viewpoint of more easily producing a laminate having a desired difference in voidage. When the expanded beads B are expanded beads having a multilayer structure as described later, it is preferred that the polypropylene resin constituting the foamed core layer satisfies the above flexural modulus.

In particular, when the flexural modulus of the base resin of the expanded beads B is larger than the flexural modulus of the base resin of the expanded beads A, the difference in voidage of the obtained laminate can be further increased, which is preferable. From such a viewpoint, the flexural modulus of the base resin of the expanded beads B is more preferably larger than the flexural modulus of the base resin of the expanded beads A by 100 MPa or more, still more preferably larger by 200 MPa or more, and particularly preferably larger by 300 MPa or more. The upper limit of the difference in flexural modulus is generally 800 MPa.

<<Configuration>>

As shown in FIG. 1, the expanded beads B may be an expanded bead 1 having a through-hole 3 penetrating the expanded bead 1 and having a cylindrical shape, or as shown in FIG. 2, may be an expanded bead 10 having a multilayer structure including a core layer 5 having a through-hole 3 and having a cylindrical shape and a cover layer 7 covering the core layer 5.

The expanded beads B are not particularly limited, but may be composed of a foamed core layer 5 and a cover layer 7 covering the foamed core layer 5 as shown in FIG. 2 from the same viewpoint as that of the expanded beads A. In this case, the expanded beads B can be produced by the same method as that for the expanded beads A.

EXAMPLES

Hereinafter, the present invention will be described in detail with reference to Examples, but the present invention is not limited thereto.

The following measurement or evaluation was performed on the resin, the expanded beads, and the expanded beads molded article in each of Examples and Comparative Examples.

[Measurement Method]

<Resin>

(Melt Flow Rate (MFR))

The MFR of the resin was measured in accordance with JIS K 7210-1:2014. The measurement conditions were a temperature of 230° C. and a load of 2.16 kg in the case of the polypropylene resins, and a temperature of 190° C. and a load of 2.16 kg in the case of the polyethylene resins.

(Melting Point)

The melting points of the resins were measured in accordance with JIS K 7121:1987, and "(2) Measurement of melting temperatures after a certain heat treatment" was employed as a condition control of a test piece of about 3 mg. The test piece was heated from 23° C. to 200° C. at a heating rate of 10° C./min, then cooled from 200° C. to 30° C. at a cooling rate of 10° C./min, and then heated from 30° C. to 200° C. at a heating rate of 10° C./min to obtain a DSC curve, the shape of the melting peak was observed, and the peak temperature of the melting peak was taken as the melting point of the test piece. In addition, when a plurality of melting peaks appear in the DSC curve, the peak temperature of the melting peak having the largest area was taken as the melting point.

(Flexural Modulus)

The flexural moth us of the resins was measured in accordance with JIS K 7171:2016, and a sheet having a thickness of 4 mm was produced by heat pressing at 230° C., and the sheet was cut into a length of 80 mm×a width of 10 mm×a thickness of 4 mm (standard test piece) and used. In addition, the radius R1 of the indenter and the radius R2 of the support base were both 5 mm, the inter-fulcrum distance was 64 mm, and the test speed was 2 mm/min.

<Expanded Beads>

(Aspect Ratio L/D)

The aspect ratio L/D of the expanded beads was obtained by measuring the maximum length (L) of 100 expanded beads selected at random and the maximum cross-sectional diameter (D) of the cross section of the beads in a direction orthogonal to the length direction of the maximum length with a caliper, calculating the ratio (L/D), and arithmetically averaging the values.

(Average Hole Diameter of Through-Holes)

The average hole diameter of the through-holes of the expanded beads was obtained as follows. Fifty or more expanded beads randomly selected from the group of expanded beads were cut perpendicularly to the through-holes at a position where the area of the cut surface was maximum. A photograph of the cut surface was taken, and in the obtained sectional photograph, the cross-sectional area (opening area) of the portion of the through-hole was obtained, the diameter of a virtual perfect circle having the same area as the area was calculated, and the value obtained by arithmetically averaging the values was taken as an average hole diameter d of the through-holes of the expanded beads.

(Average Outer Diameter)

The average outer diameter of the expanded beads was obtained as follows. Fifty or more expanded beads randomly selected from the group of expanded beads were cut perpendicularly to the through-holes at a position where the area of the cut surface was maximum. A photograph of the cut surface was taken, the cross-sectional area (the cross-sectional area including the opening portion of the through-hole) of the expanded bead A was obtained, the diameter of a virtual perfect circle having the same area as the area was calculated, and the value obtained by arithmetically averaging the values was taken as an average outer diameter D of the expanded beads.

(Apparent Density)

The apparent density of the expanded beads was obtained as follows. The group of expanded beads was allowed to stand for 2 days under conditions of a relative humidity of 50%, a temperature of 23° C., and 1 atm. Next, a measuring cylinder containing ethanol at a temperature of 23° C. was prepared, and an arbitrary amount of the group of expanded beads (mass W1 [g] of the group of expanded beads) was immersed in ethanol in the measuring cylinder using a tool such as a wire gauze. Then, in consideration of the volume of a tool such as a wire gauze, the volume V1 [L] of the group of expanded beads read from the water level rise was measured. The apparent density of the expanded beads was obtained by dividing the mass W1 [g] of the group of expanded beads put in the measuring cylinder by the volume V1 [L] (W1/V1) and converting the unit to [kg/m$^3$].

(Bulk Density)

The bulk density of the expanded beads was obtained as follows. The expanded beads were randomly taken out from the group of expanded beads and put into a measuring cylinder having a volume of 1 L, a large number of expanded beads were accommodated up to a scale of 1 L so as to be in a naturally deposited state, and the mass W2 [g] of the accommodated expanded beads was divided by the accommodating volume V2 (1 [L]) (W2/V2), and the unit was converted into [kg/m$^3$], thereby obtaining the bulk density of the expanded beads.

(Average Wall Thickness)

The average wall thickness t of the expanded beads was obtained by the following formula (3).

$$\text{Average wall thickness } t \text{ of expanded beads} = [(\text{average outer diameter } D \text{ of expanded beads}) - (\text{average hole diameter } d \text{ of expanded beads})]/2 \quad (3)$$

(Heat of Fusion of High Temperature Peak)

The heat of fusion of the high temperature peak of the expanded beads was obtained as follows. About 3 mg of the expanded beads were collected, and the temperature was raised from 23° C. to 200° C. at a rate of 10° C./minute by a DSC calorimeter (DSC Q1000, manufactured by TA instruments), thereby obtaining a DSC curve having an endothermic peak (resin intrinsic peak) due to the melting specific to the polypropylene resins and one or more melting peaks (high temperature peak) on the higher temperature side thereof. In the following description, a resin intrinsic peak is defined as A, and a high temperature peak appearing on the higher temperature side is defined as B. A straight line ($\alpha$-$\beta$) connecting a point $\alpha$ corresponding to 80° C. on the DSC curve and a point $\beta$ on the DSC curve corresponding to the end temperature of melting T of the expanded beads was drawn. Here, the end temperature of melting T refers to an intersection between the DSC curve on the higher temperature side of the high temperature peak B and the higher temperature side baseline. Next, a straight line parallel to the vertical axis of the graph was drawn from a point $\gamma$ on the DSC curve corresponding to a valley portion between the resin intrinsic peak A and the high temperature peak B, and a point at which the straight line ($\alpha$-$\beta$) crossed was defined as $\delta$. The area of the high temperature peak B was the area of the portion surrounded by the curve of the high temperature peak B portion of the DSC curve, the line segment ($\delta$-$\beta$), and the line segment ($\gamma$-$\delta$), and this was taken as the heat of fusion of the high temperature peak.

(Expanded Beads (Beads) Voidage)

The beads voidage was obtained by the following formula (4).

$$\text{Beads voidage}(\%) = (\text{opening area of expanded beads})/(\text{cross-sectional area of expanded beads}) \times 100 \quad (4)$$

Here, the cross-sectional area of the expanded beads and the opening area of the expanded beads were obtained together in the aforementioned measurement of the average hole diameter of the through-holes of the expanded beads. Specifically first, 50 or more expanded beads randomly selected from the group of expanded beads were cut perpendicularly to the through-holes at a position where the area of the cut surface was maximum. A photograph of the cut surface was taken, an area (an area including an opening portion of the through-hole) of the cut surface of the expanded beads was obtained in the obtained cross-sectional photograph, and an arithmetical average value was taken as a cross-sectional area of the expanded beads. In addition, the cross-sectional area of the through-hole portion in the obtained cross-sectional photograph was obtained, and an arithmetical average value thereof was taken as an opening area of the expanded beads.

<Expanded Beads Molded Article and Laminate>

(Thickness of Expanded Beads Molded Article (a), Expanded Beads Molded Article (b), and Laminate)

The thickness of each of the expanded beads molded article and the laminate was obtained by the above method. Specifically; the volume of each of the expanded beads molded article (a), the expanded beads molded article (b), and the laminate was calculated from the external dimensions thereof, and the obtained volume was divided by the projected area of each of the expanded beads molded article (a), the expanded beads molded article (b), and the laminate as viewed from the top, and the unit was converted into [mm] to obtain the thickness.

(Voidage of Expanded Beads Molded Article)

The voidage of each of the expanded beads molded article (a) and the expanded beads molded article (b) was obtained as follows. A test piece having a rectangular parallelepiped shape cut out from the central portion of the expanded beads molded article (a) constituting the laminate was immersed in a measuring cylinder containing ethanol, and the true volume Vc [L] of the test piece was obtained from the rise in the liquid level of ethanol. In addition, the apparent volume Vd [L] was obtained from the external dimensions (a length 25 mm×a width 25 mm×a height 100 mm) of the test piece. From the obtained true volume Vc and apparent volume Vd, the voidage of the expanded beads molded article (a) was obtained by the following formula (2). The voidage of the expanded beads molded article (b) was also measured in the same manner.

$$\text{Voidage}(\%) = [(Vd - Vc)/Vd] \times 100 \quad (2)$$

(Density of Laminate)

Regarding the density of the laminate, three test pieces were randomly cut out so as to have a rectangular parallelepiped shape having a length of 25 mm×a width of 25 mm×a thickness of 100 mm, excluding the skin layer at the time of molding from the laminate, the mass and volume of each test piece were measured, the apparent densities of the three test pieces were calculated, and the density of the laminate was obtained as an arithmetic average value thereof.

(Maximum Bending Strength of Expanded Beads Molded Article (a))

The bending strength was measured in accordance with JIS K 7221-2:2006, and the maximum point of the bending strength of the expanded beads molded article was measured as the maximum bending strength.

Specifically, a test, piece having a length of 120 mm, a width of 25 mm, and a thickness of 20 mm was cut out from the central portion in the thickness direction of the expanded beads molded article (a) of the laminate by removing the skin on the surface. Using this test piece, the bending strength was measured based on JIS K 7221-2:2006, except that the descending speed of the pressurized wedge was 10 mm/min, the inter-fulcrum distance was 100 mm, the radius of the tip end portion of the support base was 5 mm, and the radius of the tip end portion of the pressurized wedge was 5 mm.

When the maximum bending strength of the expanded beads molded article (a) of the laminate is low, the mechanical strength of the whole laminate becomes low. In particular, in a state where the end portion of the expanded beads molded article (a) of the laminate is fixed, when an external force is applied from the expanded beads molded article (b) side, there is a concern that a crack or the like may occur in the expanded beads molded article (a).

[Evaluation Method]

(Appearance of Laminate)

The appearance of the laminates of Examples and Comparative Examples was evaluated as described below. The appearance was visually evaluated using, as an evaluation target, a region of 200 mm×200 mm as viewed from the top in the vicinity of the central portion of the expanded beads molded article (a) side of the laminate. Specifically ten persons skilled in the art performed a sensory test of five stage evaluation in which a case where the shape of the mold was sufficiently transferred to the surface was scored as 5 and a case where the shape of the mold was not sufficiently transferred to the surface was scored as 1, and the scores were arithmetically averaged and evaluated according to the following criteria.
A: The average score is 3.5 or more.
B: The average score is 2.0 or more and less than 3.5.
C: The average score is less than 2.0.

<Production of Expanded Beads and Expanded Beads Molded Article>

The resins mainly used for producing the expanded beads are shown in Table 1. Both of the polypropylene resins PP1 and PP2 used as the base resins of the expanded beads are ethylene-propylene random copolymers. The polypropylene resin PP3 used as the resin for forming the cover layer is an ethylene-propylene-butene random copolymer, and PE1 is a linear low-density polyethylene (LLDPE).

TABLE 1

| Base resin | Manufacturer | Type | MFR [g/10 min] | Melting point [° C.] | Flexural modulus [MPa] |
|---|---|---|---|---|---|
| PP1 | Prime Polymer Co., Ltd. | PP | 8 | 142 | 980 |
| PP2 | Prime Polymer Co., Ltd. | PP | 7 | 151 | 1470 |
| PP3 | Japan Polypropylene Corporation | PP | 6 | 133 | 650 |
| PE1 | Japan polyethylene Corporation | LLDPE | 10 | 100 | 110 |

<Production of Expanded Beads>
Expanded Beads 1 to 5
(Granulation Step)

An extruder including a core layer-forming extruder, a cover layer-forming extruder, and a multilayer strand-forming die disposed on the outlet side of the extruder was used. The base resin constituting the foamed core layer described in Table 2 was supplied to the core layer-forming extruder and melt-kneaded to form a core layer-forming melt-kneaded product, and the resin constituting the cover layer described in Table 2 (the total amount of the resin constituting the core layer and the resin constituting the cover layer was 100% by mass) was supplied to the cover layer-forming extruder and melt-kneaded to form a cover layer-forming melt-kneaded product. Next, the core layer-forming melt-kneaded product and the cover layer-forming melt-kneaded product were introduced into the multilayer strand-forming die and merged, and extruded from a small hole of a die attached to the tip of the extruder into a cylindrical strand having a through-hole (core layer: 95% by mass, cover layer: 5% by mass). After water-cooling, the strand was cut with a pelletizer so that the mass was about 1.5 mg and the aspect ratio (L/D) was 1, and dried to obtain multilayer resin particles 1 having a through-hole. In addition, 1000 ppm of zinc borate as a cell controlling agent was added to 100 parts by mass of the multilayer resin particles in the thermoplastic resin composition constituting the core layer.

(Dispersion Step, Impregnation Step, and Expanding Step)

In a sealed container having a volume of 400 L equipped with a stirrer, 315 L of water as a dispersing medium, 115 kg of the obtained multilayer resin particles, 0.3 kg of kaoline as a dispersing agent, 0.03 kg of a surfactant (NEOGEN S-20F; sodium alkylbenzenesulfonate, manufactured by DKS Co., Ltd.) as an active ingredient amount, and 0.01 kg of aluminum sulfate as a dispersing aid were charged, and carbon dioxide as a blowing agent was pressed in at 0.20 MPa(G) (0.15 MPa(G) in the case of the expanded beads 3). Next, the temperature of the dispersing medium was raised to 148.5° C. under stirring, and the dispersing medium was held for 6 minutes to obtain foamable multilayer resin particles. Next, the temperature of the dispersing medium was raised to 149° C., and the dispersing medium was held for 15 minutes, and then the sealed container was opened while pressing 0.32 MPa(G) with carbon dioxide, and the foamable multilayer resin particles were released from the sealed container together with the dispersing medium to atmospheric pressures, thereby obtaining expanded beads having a through-hole (first stage expanded beads). The obtained expanded beads were aged under atmospheric conditions of 23° C. and 24 hours, and then the physical properties were measured. Physical properties and the like of the obtained expanded beads 1 to 5 are shown in Table 2.

In the production of the expanded beads 1 to 5, the outer diameter and the inner diameter of the multilayer strand-forming die were appropriately adjusted so that the resulting expanded beads had desired physical properties. Further, second stage expanding was performed under the following conditions as appropriate.

(Second Stage Expanding)

After a pressure-resistant container was filled with the first stage expanded beads, air as an inorganic gas was injected into the pressure-resistant container to impregnate the cells with the inorganic gas. At this time, the internal cell pressure of the first stage expanded beads was 0.45 MPa(G). Next, steam was supplied to the first stage expanded beads taken out from the pressure-resistant container, and the beads were heated and expanded under atmospheric pressure (second stage expanded beads). The pressure of the steam supplied during heating was set to 0.32 MPa(G).

Expanded Beads 6

Expanded beads 6 were produced in the same manner as in the production of expanded beads 1, except that no through-hole was provided and the expanded beads were cut with a pelletizer so as to have a mass of about 1 mg.

Production of Laminate

Example 1

Expanded beads 1 were used as expanded beads A, and expanded beads 4 were used as expanded beads B. The expanded beads B were filled into a mold (molding die) in an amount of cracking (first layer cracking) shown in Table 3, and the mold was clamped so that the length in the thickness direction of the molding space of the expanded beads B became 30 mm, and then steam was introduced into the mold to temporarily fusion bond the expanded beads B at a molding pressure of 0.14 MPa(G). Next, the movable mold was opened, the expanded beads A were filled in the amount of cracking (cracking at the time of integral molding) described in Table 3, the mold was clamped so that the length in the thickness direction of the molding space of the expanded beads A became 30 mm, then steam was introduced into the mold, main heating was carried out, molding was carried out at a molding pressure of 0.22 MPa(G), the molding was integrally laminated, and the laminate was cooled and taken out from the mold. Further, the laminate was heated, dried, and aged in an oven at 60° C. for 24 hours to obtain a laminate in the form of a flat plate having a length of 300 mm×a width of 250 mm×a thickness of 60 mm. Physical properties and the like of the obtained laminate are shown in Table 3.

Example 2

A laminate of Example 2 was Obtained in the same manner as in Example 1, except that the expanded beads 2 were used as the expanded beads A. Physical properties and evaluation results of the obtained laminate are shown in Table 3.

Example 3

A laminate of Example 3 was obtained in the same manner as in Example 2, except that the filling order of the expanded beads and the amount of cracking were changed as shown in Table 3 when the laminate was produced. Physical properties and evaluation results of the obtained laminate are shown in Table 3.

Example 4

A laminate of Example 4 was obtained in the same manner as in Example 1, except that the expanded beads 2 were used as the expanded beads A and the expanded beads 5 were used as the expanded beads B. Physical properties and evaluation results of the obtained laminate are shown in Table 3.

Example 5

A laminate of Example 5 was obtained in the same manner as in Example 1, except that the expanded beads 3 were used as the expanded beads A. Physical properties and evaluation results of the obtained laminate are shown in Table 3.

Example 6

A laminate of Example 6 was obtained in the same manner as in Example 1, except that the molding pressure when molding the laminate was changed to the molding pressure described in Table 3. Physical properties and evaluation results of the obtained laminate are shown in Table 3.

TABLE 2

|  |  |  | Expanded beads 1 | Expanded beads 2 | Expanded beads 3 | Expanded beads 4 | Expanded beads 5 | Expanded beads 6 |
|---|---|---|---|---|---|---|---|---|
| Expanded beads | Name of expanded beads | — | Expanded beads 1 | Expanded beads 2 | Expanded beads 3 | Expanded beads 4 | Expanded beads 5 | Expanded beads 6 |
|  | Base resin (foamed core layer) | — | 95% PP1 | 95% PP1 | 95% PP1 | 95% PP1 | 95% PP2 | 95% PP1 |
|  | Resin (cover layer) | — | 5% PP3 | 5% PP3 | 5% PP3 | 5% PP3 | 5% PE1 | 5% PP3 |
|  | Particle weight | mg | 1.5 mg | 1.5 mg | 1.5 mg | 1.5 mg | 1.5 mg | 1 mg |
|  | Second stage expanding | — | Yes | No | No | No | No | Yes |
|  | Aspect ratio L/D | — | 1 | 1 | 1 | 1 | 1 | 1 |
|  | Opening area | mm² | 2.02 | 0.38 | 2.90 | 4.16 | 4.47 | — |
|  | Average hole diameter d of through-holes | mm | 1.60 | 0.70 | 1.92 | 2.30 | 2.39 | — |
|  | Cross-sectional area of beads | mm² | 11.7 | 10.0 | 9.1 | 12.4 | 11.3 | 7.3 |
|  | Average outer diameter D | mm | 3.9 | 3.6 | 3.4 | 4.0 | 3.8 | 3.1 |
|  | Ratio [d/D] | — | 0.42 | 0.20 | 0.57 | 0.58 | 0.63 | — |
|  | Apparent density | kg/m³ | 42.9 | 44.0 | 82.5 | 52.3 | 59.3 | 44.1 |
|  | Bulk density | kg/m³ | 21.1 | 25.0 | 33.1 | 21.8 | 24.9 | 26.3 |
|  | Apparent density/bulk density | — | 2.03 | 1.76 | 2.50 | 2.40 | 2.39 | 1.68 |
|  | Average wall thickness t | mm | 1.1 | 1.4 | 0.7 | 0.8 | 0.7 | — |
|  | High temperature peak | J/g | 14.7 | 13.4 | 15.0 | 14.8 | 20.7 | 14.0 |
|  | Beads voidage | % | 17.3 | 3.8 | 31.9 | 33.4 | 39.6 | — |

TABLE 3

|  |  |  | Example 1 | Example 2 | Example 3 | Example 4 | Example 5 | Example 6 |
|---|---|---|---|---|---|---|---|---|
| Expanded beads | Expanded beads A | — | Expanded beads 1 | Expanded beads 2 | Expanded beads 2 | Expanded beads 2 | Expanded beads 3 | Expanded beads 1 |
|  | Expanded beads B | — | Expanded beads 4 | Expanded beads 4 | Expanded beads 4 | Expanded beads 5 | Expanded beads 4 | Expanded beads 4 |
|  | Difference $[d_B - d_A]$ (y) | mm | 0.7 | 1.6 | 1.6 | 1.7 | 0.4 | 0.7 |
|  | Difference $[D_B - D_A]$ (x) | mm | 0.1 | 0.4 | 0.4 | 0.2 | 0.6 | 0.1 |
|  | x + y | mm | 0.8 | 2.0 | 2.0 | 1.9 | 1.0 | 0.8 |
| Integral molding step | Filling order of expanded beads | — | B→A | B→A | A→B | B→A | B→A | B→A |
|  | First layer molding pressure | MPa(G) | 0.14 | 0.14 | 0.14 | 0.14 | 0.14 | 0.14 |
|  | First layer cracking | mm | 1 | 1 | 6 | 1 | 1 | 1 |
|  | Integral molding pressure | MPa(G) | 0.22 | 0.22 | 0.22 | 0.22 | 0.22 | 0.18 |
|  | Cracking during integral molding | mm | 6 | 6 | 6 | 6 | 6 | 6 |
| Laminate | Thickness $H_a$ of expanded beads molded article (a) | mm | 33 | 34 | 34 | 34 | 30 | 34 |
|  | Thickness $H_b$ of expanded beads molded article (b) | mm | 27 | 26 | 26 | 26 | 30 | 26 |
|  | Total thickness | mm | 60 | 60 | 60 | 60 | 60 | 60 |
|  | Volume ratio $(V_a:V_b)$ | % | 55:45 | 57:43 | 57:43 | 57:43 | 50:50 | 57:43 |
|  | Voidage $(P_a)$ of expanded beads molded article (a) | % | 15 | 13 | 16 | 10 | 13 | 15 |
|  | Voidage $(P_b)$ of expanded beads molded article (b) | % | 22 | 22 | 24 | 31 | 24 | 26 |

TABLE 3-continued

|  |  | Example 1 | Example 2 | Example 3 | Example 4 | Example 5 | Example 6 |
|---|---|---|---|---|---|---|---|
| Difference in voidage ($P_b - P_a$) | % | 7 | 9 | 8 | 21 | 12 | 11 |
| Density | kg/m³ | 26.9 | 28.8 | 31.0 | 32.9 | 36.7 | 37.7 |
| Maximum bending strength of expanded beads molded article (a) | MPa | 0.25 | 0.26 | 0.26 | 0.26 | 0.45 | 0.26 |
| Appearance evaluation | — | A | A | A | A | A | A |

Comparative Example 1

A laminate of Comparative Example 1 was obtained in the same manner as in Example 1, except that the expanded beads 6 were used as the expanded beads A. Physical properties and evaluation results of the obtained laminate are shown in Table 4.

Comparative Example 2

A laminate of Comparative Example 2 was obtained in the same manner as in Comparative Example 1, except that the molding pressure when molding the laminate was changed to the molding pressure described in Table 4. Physical properties and evaluation results of the obtained laminate are shown in Table 4.

Comparative Example 3

A laminate of Comparative Example 3 was obtained in the same manner as in Example 1, except that the expanded beads 4 were used as the expanded beads A and the expanded beads B, and the amount of cracking and the molding pressure when molding the laminate were changed to the values described in Table 4. Physical properties and evaluation of the obtained laminate are shown in Table 4.

Comparative Example 4

A laminate of Comparative Example 4 was obtained in the same manner as in Comparative Example 3, except that in the production of the laminate, the filling order of the expanded beads was changed to the order of the expanded beads A and the expanded beads B, the molding pressure in temporarily fusion bonding the expanded beads A was changed to the molding pressure described in Table 4, and the amount of cracking and the molding pressure when molding the laminate were changed to the values described in Table 4. Physical properties and evaluation of the obtained laminate are shown in Table 4.

Comparative Example 5

A laminate of Comparative Example 5 was obtained in the same manner as in Example 1, except that the expanded beads 3 were used as the expanded beads B. Physical properties and evaluation results of the obtained laminate are shown in Table 4.

TABLE 4

|  |  |  | Comparative Example 1 | Comparative Example 2 | Comparative Example 3 | Comparative Example 4 | Comparative Example 5 |
|---|---|---|---|---|---|---|---|
| Expanded beads | Expanded beads A | — | Expanded beads 6 | Expanded beads 6 | Expanded beads 4 | Expanded beads 4 | Expanded beads 1 |
|  | Expanded beads B | — | Expanded beads 4 | Expanded beads 4 | Expanded beads 4 | Expanded beads 4 | Expanded beads 3 |
|  | Difference [$d_B - d_A$] (y) | mm | — | — | 0 | 0 | 0.3 |
|  | Difference [$D_B - D_A$] (x) | mm | 0.9 | 0.9 | 0 | 0 | −0.5 |
|  | x + y | mm | 0.9 | 0.9 | 0 | 0 | −0.1 |
| Integral molding step | Filling order of expanded beads | — | B→A | B→A | B→A | A→B | B→A |
|  | First layer molding pressure | MPa(G) | 0.14 | 0.14 | 0.14 | 0.30 | 0.14 |
|  | First layer cracking | mm | 1 | 1 | 1 | 1 | 1 |
|  | Integral molding pressure | MPa(G) | 0.22 | 0.34 | 0.30 | 0.22 | 0.22 |
|  | Cracking during integral molding | mm | 6 | 6 | 19 | 6 | 6 |
| Laminate | Thickness $H_a$ of expanded beads molded article (a) | mm | 34 | 44 | 34 | 30 | 32 |
|  | Thickness $H_b$ of expanded beads molded article (b) | mm | 26 | 16 | 26 | 30 | 28 |
|  | Total thickness | mm | 60 | 60 | 60 | 60 | 60 |
|  | Volume ratio ($V_a:V_b$) | % | 57:43 | 73:27 | 57:43 | 50:50 | 53:47 |
|  | Voidage ($P_a$) of expanded beads molded article (a) | % | 9 | 2 | 19 | 25 | 12 |
|  | Voidage ($P_b$) of expanded beads molded article (b) | % | 22 | 6 | 21 | 29 | 10 |
|  | Difference in voidage ($P_b - P_a$) | % | 13 | 4 | 1 | 4 | −2 |
|  | Density | kg/m³ | 30.4 | 30.0 | 34.6 | 29.2 | 37.5 |
|  | Maximum bending strength of expanded beads molded article (a) | MPa | 0.13 | 0.37 | 0.29 | 0.29 | 0.45 |
|  | Appearance evaluation | — | C | C | A | B | A |

As can be seen from Table 3, according to the method for producing a laminate of the present invention, a laminate having excellent mechanical strength and a desired difference in voidage can be easily obtained. Specifically, a laminate having a desired difference in voidage can be obtained in a wide range of molding conditions, and in particular, a laminate having a desired difference in voidage can be obtained even at a low molding pressure. Further, the order of filling the expanded beads A and the expanded beads B was not limited. Furthermore, the obtained laminate was also excellent in appearance. As can be seen from Example 5, as long as the expanded beads A and the expanded beads B satisfy the specific relationship of the present invention, it was possible to produce a laminate having a desired difference in voidage even when the beads voidage of the expanded beads A and the beads voidage of the expanded beads B were about the same.

As can be seen from Comparative Examples 1 to 5, when the expanded beads not satisfying the above requirements (1) to (3) were used, it was difficult to obtain a laminate having excellent mechanical strength and a desired difference in voidage by integral molding.

Comparative Examples 1 and 2 are examples in which expanded beads having no through-holes are used as the expanded beads A. In Comparative Example 1, the voids of the expanded beads molded article (a) were formed by the voids formed between the expanded beads, but the obtained laminate was remarkably inferior in mechanical strength. On the other hand, in Comparative Example 2, an attempt was made to improve the mechanical strength by changing the molding conditions from Comparative Example 1, but the voidages of the expanded beads molded article (a) and the expanded beads molded article (b) were decreased, and the difference in voidage between the expanded beads molded article (a) and the expanded beads molded article (b) was also decreased.

Comparative Examples 3 and 4 are examples using the same type of expanded beads. When a laminate is integrally molded by using the same type of expanded beads, it is difficult to obtain a laminate having excellent mechanical strength and a desired difference in voidage even if the molding conditions are adjusted.

Comparative Example 5 is an example using a combination of expanded beads in which the difference between the average hole diameter $d_A$ and the average hole diameter $d_B$ is within the desired range, but the average outer diameter $D_B$ of the expanded beads 13 is small and the above requirements (2) and (3) are not satisfied. The obtained laminate did not have a desired difference in voidage, which is considered to be caused by the fact that the void between the expanded beads could not be effectively utilized because the filling properties of the expanded beads B were excessively good.

INDUSTRIAL APPLICABILITY

The laminate obtained by the method for producing a laminate of the present invention is excellent in mechanical strength and has a desired difference in voidage, and therefore is suitable for applications such as automobile members and building materials as a sound absorbing material, a moisture permeable material, a water permeable material, and the like.

REFERENCE SIGNS LIST 1, 10: Expanded bead, 3: Through-hole, 5: (Foamed) core layer, 7: Cover layer

The invention claimed is:

1. A method for producing a laminate, comprising integrally molding in a mold cylindrical expanded thermoplastic resin beads A having a through-hole and an aspect ratio L/D of less than 2 and cylindrical expanded thermoplastic resin beads B having a through-hole and an aspect ratio L/D of less than 2, the method comprising:
    filling expanded beads A in the mold;
    filling expanded beads B in the mold; and
    integrally heating expanded beads A and expanded beads B by supplying a heating medium,
    wherein the laminate is a laminate in which an expanded beads molded article (a) composed of the expanded beads A and having interconnected voids and an expanded beads molded article (b) composed of the expanded beads B and having interconnected voids are integrally laminated,
    a difference $[P_b-P_a]$ between a voidage ($P_a$) of the expanded beads molded article (a) and a voidage ($P_b$) of the expanded beads molded article (b) is 5% or more,
    the voidage ($P_a$) of the expanded beads molded article (a) is 20% or less, and
    the expanded beads A and the expanded beads B satisfy the following requirements (1) to (3):
    (1) a difference $[d_B-d_A]$ between an average hole diameter $d_A$ of the through-holes of the expanded beads A and an average hole diameter $d_B$ of the through-holes of the expanded beads B is 0.3 mm or more and 2 mm or less;
    (2) the expanded beads B have an average outer diameter $D_B$ of 3.5 mm or more and 5 mm or less;
    (3) a difference $[D_B-D_A]$ between an average outer diameter $D_A$ of the expanded beads A and an average outer diameter $D_B$ of the expanded beads B is −0.3 mm or more and 2 mm or less.

2. The method for producing a laminate according to claim 1, wherein the average hole diameter $d_A$ of the through-holes of the expanded beads A is 0.5 mm or more and 2 mm or less.

3. The method for producing a laminate according to claim 1, wherein the average hole diameter $d_B$ of the through-holes of the expanded beads B is 2 mm or more and 3 mm or less.

4. The method for producing a laminate according to claim 1, wherein the average outer diameter $D_A$ of the expanded beads A is 2 mm or more and 4.5 mm or less, and the difference $[D_B-D_A]$ between the average outer diameter $D_A$ of the expanded beads A and the average outer diameter $D_B$ of the expanded beads B is 0.1 mm or more and 2 mm or less.

5. The method for producing a laminate according to claim 1, wherein a relationship between the difference $[d_B-d_A]$ (x) between the average hole diameter $d_A$ of the through-holes of the expanded beads A and the average hole diameter $d_B$ of the through-holes of the expanded beads B and the difference $[D_B-D_A]$ (y) between the average outer diameter $D_A$ of the expanded beads A and the average outer diameter $D_B$ of the expanded beads B satisfies the following formula (1):

$$0.6 \leq x+y \leq 2.2 \qquad (1).$$

6. The method for producing a laminate according to claim 1, wherein a ratio $[d_A/D_A]$ of the average hole diameter $d_A$ to the average outer diameter $D_A$ of the expanded beads A is 0.3 or less.

7. The method for producing a laminate according to claim 1, wherein a ratio of an apparent density of the expanded beads A to a bulk density of the expanded beads A is 1.7 or more and 2.3 or less, and a ratio of an apparent density of the expanded beads B to a bulk density of the expanded beads B is 2.3 or more and 3.0 or less.

8. The method for producing a laminate according to claim 1, wherein the expanded beads A are expanded polyolefin resin beads, and the expanded beads B are expanded polyolefin resin beads.

9. The method for producing a laminate according to claim 1, wherein the expanded beads A are composed of a polyolefin resin foamed core layer and a polyolefin resin cover layer covering the foamed core layer.

10. The method for producing a laminate according to claim 1, wherein the expanded beads B are composed of a polyolefin resin foamed core layer and a polyolefin resin cover layer covering the foamed core layer, and the polyolefin resin constituting the foamed core layer has a flexural modulus of 1000 MPa or more and 1500 MPa or less.

11. The method for producing a laminate according to claim 1, wherein a ratio $[V_a:V_b]$ between a volume ($V_a$) of the expanded beads molded article (a) and a volume ($V_b$) of the expanded beads molded article (b) is 80:20 to 10:90.

* * * * *